United States Patent
Klein et al.

(10) Patent No.: US 7,058,399 B2
(45) Date of Patent: Jun. 6, 2006

(54) SEARCH WINDOW DELAY TRACKING IN CODE DIVISION MULTIPLE ACCESS COMMUNICATION SYSTEMS

(75) Inventors: Oliver Klein, Nürnberg (DE); Ingolf Held, Nürnberg (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 695 days.

(21) Appl. No.: 09/901,571

(22) Filed: Jul. 11, 2001

(65) Prior Publication Data
US 2004/0132443 A1    Jul. 8, 2004

(51) Int. Cl.
H04Q 7/20    (2006.01)
H04B 1/60    (2006.01)
H04B 17/00    (2006.01)
H04B 17/02    (2006.01)

(52) U.S. Cl. .................. 455/424; 455/10; 455/504; 455/506; 455/517; 455/67.16; 370/342; 375/142; 375/150

(58) Field of Classification Search ......... 379/390.02, 379/414, 416, 398, 392.01, 390.01; 455/424, 455/423, 42, 504, 506, 511, 10, 9, 11.1, 63, 455/67.3, 67.6, 517, 505, 67.1, 67.16; 370/203, 370/320, 342, 335; 375/142, 150
See application file for complete search history.

(56) References Cited

U.S. PATENT DOCUMENTS 3,394,313 A * 7/1968 Ellis et al. ............ 375/308
5,544,156 A * 8/1996 Teder et al. ............ 370/342
6,104,747 A * 8/2000 Jalloul et al. ........... 375/150
6,256,338 B1 * 7/2001 Jalloul et al. ........... 375/142
6,288,674 B1 * 9/2001 Sengupta et al. ........ 342/418
6,373,882 B1 * 4/2002 Atarius et al. .......... 375/148
6,542,562 B1 * 4/2003 Ostberg et al. .......... 375/350
2001/0041536 A1 * 11/2001 Hasegawa .............. 455/67.1
2002/0054621 A1 * 5/2002 Kyeong et al. .......... 375/147
2002/0159507 A1 * 10/2002 Flaig et al. ............. 375/148

FOREIGN PATENT DOCUMENTS

WO    99/57819 A    11/1999
WO    00/38343 A    6/2000

OTHER PUBLICATIONS

U.S. Appl. No. 09/320,638, filed May 26, 1999.
U.S. Appl. No. 09/070,778, filed May 1, 1998.

* cited by examiner

Primary Examiner—Binh K. Tieu
(74) Attorney, Agent, or Firm—Nixon & Vanderhye, P.C.

(57) ABSTRACT

The present invention provides a search window delay tracking procedure for use in a multipath search processor of a CDMA radio receiver. A channel impulse response is estimated for a received signal containing plural paths, each path having a corresponding path delay. A search window defines a delay profile that contains the plural paths of the received signal. A mean or average delay is calculated for the estimated channel impulse response (CIR), and an error is determined between the mean CIR delay and a desired or target delay position of the Cir. search window. An adjustment is made to reduce that error to align the targeted position of the search window and the mean CIR delay. A Doppler frequency is estimated for each path. The adjustment is made taking into account a Doppler effect caused by relative movement between the transmitter and receiver.

45 Claims, 9 Drawing Sheets

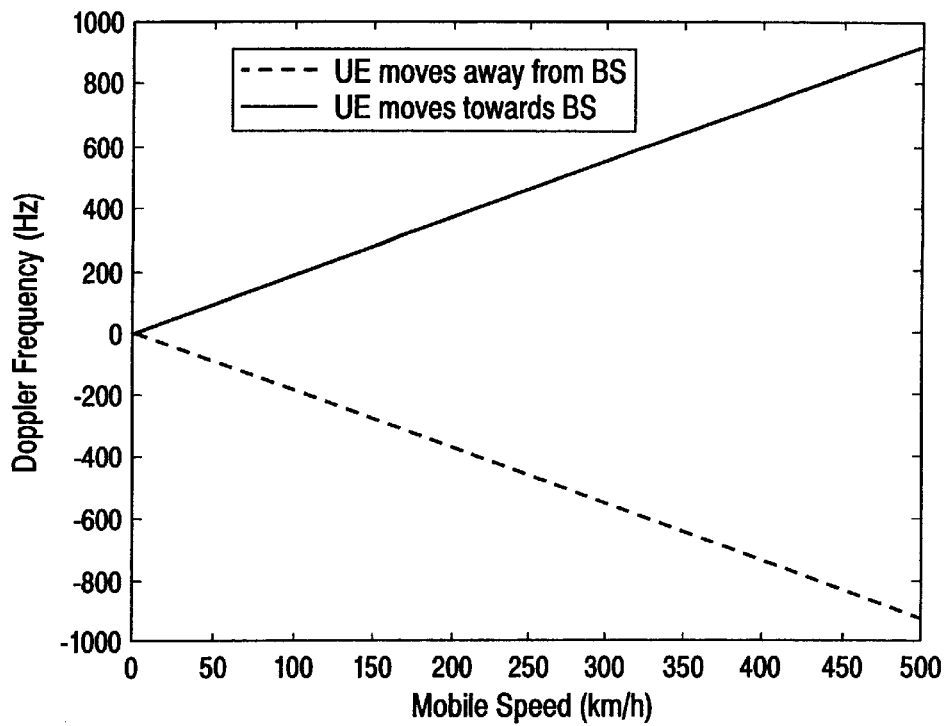
Fig. 9 Doppler Frequency $f_{Doppler,\ max}$ as a Function of Mobile Speed v
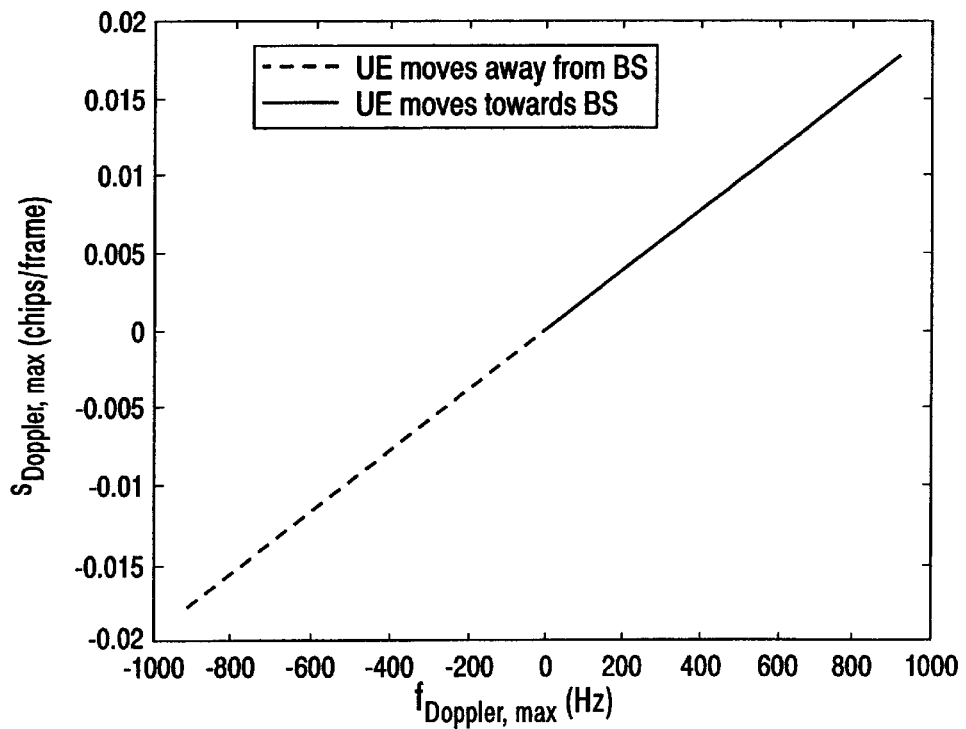
Fig. 10 Maximum Doppler Delay Shift $s_{Doppler,\ max}$ as a Function of Doppler Frequency $f_{Doppler,\ max}$

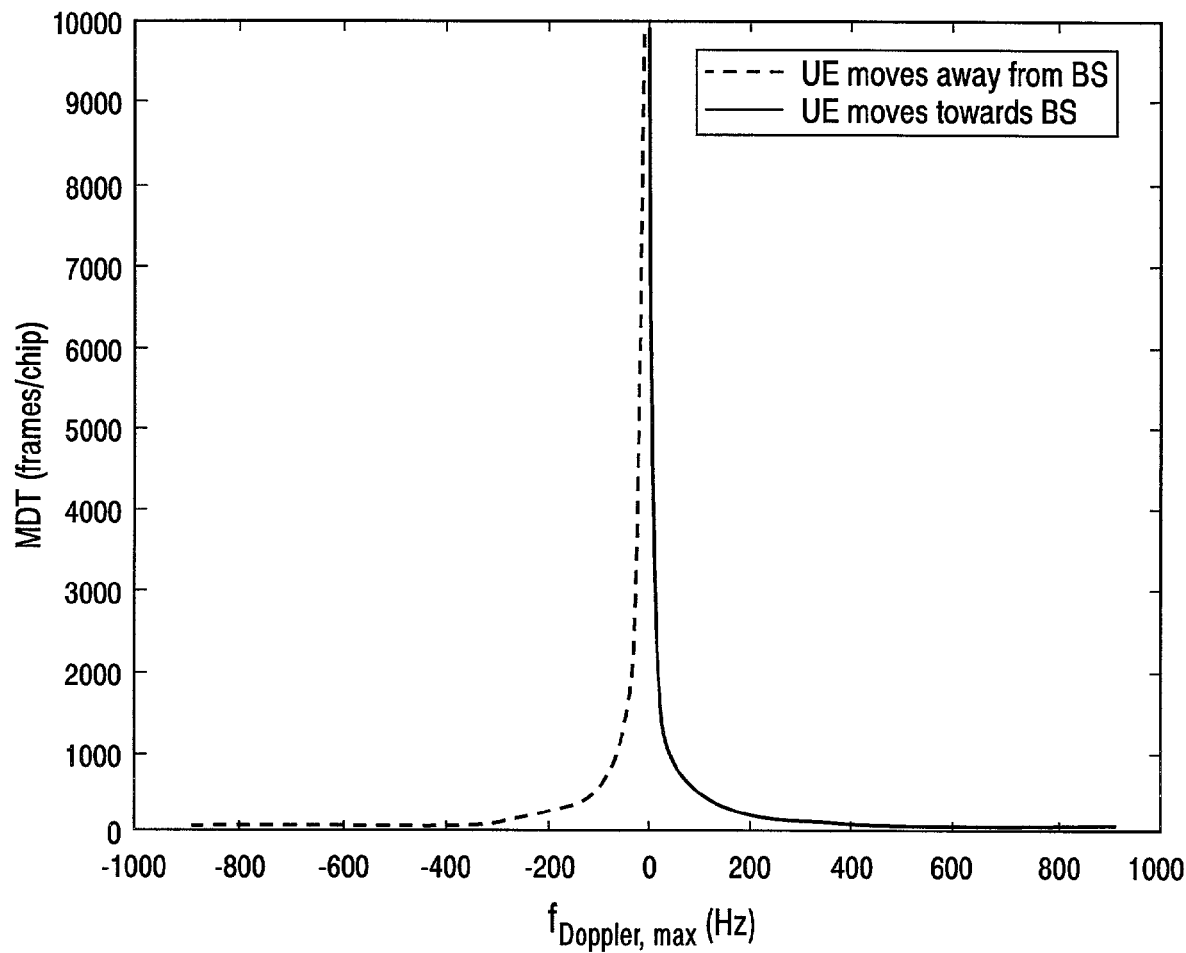
Fig. 11 Minimum Dwell Time as a Function of Doppler Frequency $f_{Doppler, max}$

SEARCH WINDOW DELAY TRACKING IN CODE DIVISION MULTIPLE ACCESS COMMUNICATION SYSTEMS

FIELD OF THE INVENTION

The present invention relates to code division multiple access (CDMA) communication in cellular radio telephone communication systems, and more particularly, to a multipath search processor employed in a CDMA RAKE type receiver.

BACKGROUND AND SUMMARY OF THE INVENTION

Direct sequence code division multiple access (DS-CDMA) allows signals to overlap in both time and frequency so that CDMA signals from multiple users simultaneously operate in the same frequency band or spectrum. In principle, a source information digital data stream to be transmitted is impressed upon a much higher rate data stream generated by a pseudo-random noise (PN) code generator. This combining of a higher bit rate code signal with a lower bit rate data information stream "spreads" the bandwidth of the information data stream. Accordingly, each information data stream is allocated a unique PN or spreading code (or a PN code having a unique offset in time) to produce a signal that can be separately received at a receiving station. From a received composite signal of multiple, differently coded signals, a specifically PN coded information signal is isolated and demodulated by correlating the composite signal with the specific PN spreading code associated with that specific information signal. This inverse de-spreading operation compresses the received signal to permit recovery of the original data signal and at the same time suppresses interference from other users.

In addition to receiving signals transmitted from several different transmitting information sources, a receiver may also receive multiple, distinct propagation paths of the same signal transmitted from a single transmitter source. One characteristic of such a multipath channel is an introduced time spread. For example, if an ideal pulse is transmitted over a multipath channel, the received corresponding signal appears as a stream of pulses, each pulse or path having a corresponding different time delay, as well as different amplitude and phase. Such a complex received signal is usually called the channel impulse response (CIR). Multipaths are created in a mobile radio channel by reflection of the signal from obstacles in the environment such as buildings, trees, cars, people, etc. Moreover, the mobile radio channel is dynamic in the sense it is time varying because of relative motion affecting structures that create the multipaths. For a signal transmitted over a time varying multipath channel, the received corresponding multiple paths vary in time, location, attenuation, and phase.

The existence of multiple paths, however, may be used to advantage in a CDMA system using signal diversity combining techniques. One advantage concerns signal fading which is a particular problem in mobile communications. Although each multipath signal may experience a fade, all of the multipaths usually do not fade simultaneously. Therefore, a diversity-combined signal output from a CDMA receiver is not adversely affected by a temporary fade of one multipath.

A CDMA receiver in accordance with the present invention employs a multipath search processor that searches for and identifies the strongest multipaths along with their corresponding time delays. A RAKE demodulator captures most of the received signal energy by allocating a number of parallel demodulators (called RAKE "fingers") to the strongest multipath components of the received multipath signal as determined by the multipath search processor. The outputs of each of the RAKE fingers are diversity-combined after corresponding delay compensation to generate a "best" demodulated signal that considerably improves the quality and reliability of communications in a CDMA cellular radio communications system.

The multipath search processor, (sometimes referred to herein as simply "searcher") estimates the channel impulse response of a complex received signal in order to extract the relative delays of various multipath components. The searcher also tracks changing propagation conditions resulting from movement of the mobile station or some other object associated with one of the multipaths to adjust the extracted delays accordingly.

More specifically, the channel impulse response of a received multipath signal is estimated within a certain range of path arrival times or path arrival delays called a "search window." This window is defined by the number of spreading code phases which should be searched to cover the maximum expected delay spread. All signals detected within the search window form the delay profile, but only those signals originated from the transmitter belong to the channel impulse response. The remaining received signals in the delay profile are noise and interference. When the signals forming the delay profile are represented by their respective powers and delays, the delay profile is called power delay profile (PDP).

The channel impulse response is estimated very frequently so that delay variations of the radio channel can be tracked. In particular, the position of the channel impulse response within the search window frequently changes because of movement of the mobile station or other object motion as well as from frequency mismatch of the PN sequence generators used at the transmitter for spreading and at the receiver for de-spreading. As a result, the position of the search window must be updated and adjusted to keep the channel impulse response in the middle of the search window. The update time should be small enough so that the delay variations of the radio channel can be tracked.

The position of the channel impulse response within the search window changes as a result of motion of the mobile station (and the resulting change of propagation delay) as well as the frequency mismatch of the transmitter and receiver PN sequence generators. A window tracking unit (WTU) adjusts the position of the search window to keep the channel impulse response within the search window by tracking the time-varying delay between the mobile station PN code and the reference PN code of the base station.

It is desirable to make the search window adaptation robust in order to minimize the influence of noise, interference, and fading. It is particularly difficult to keep the channel impulse within the search window under certain propagation conditions including, for example, slow fading conditions, e.g., 0.5 km/h–3 km/h, as well as fast fading conditions, e.g., 250 km/h–500 km/h. Fading is a problem because when a path in the search window "disappears" because of a fade, the natural response of the WTU is to adjust the position of the search window, often significantly, assuming that the path no longer exists. But that assumption is typically wrong because the faded path very often reappears. If the search window is adjusted too rapidly, it may be badly misaligned when the faded path reappears. Another area of concern is the need to use fine-tuned decision threshold(s) in search window tracking, which add to the complexity and delay of the tracking adjustment process. These difficulties are overcome with the present invention.

Thus, it is an object of the present invention to adapt the search window position in order to maintain accurate alignment between the estimated channel impulse response and the search window under a wide range of propagation conditions.

It is also an object of the present invention to provide a robust search window delay adjustment procedure that minimizes the influence of noise, interference, and fading, and in particular, takes into account a likelihood that faded paths may reappear.

It is a further object of the invention to avoid the use of one or more decision thresholds to accomplish accurate window tracking adjustment.

The present invention provides a search window delay tracking procedure for use in a multipath search processor of a CDMA radio receiver. A channel impulse response is estimated for a received signal containing plural paths, each path having a corresponding path delay. A search window defines a delay profile that contains: (1) the plural multipath components of the received signal forming the channel impulse response (CIR), and (2) noise and interference signals at delays where the transmitted multipath components do not exist. A mean or average delay is calculated for the estimated channel impulse response, and an error is determined between the mean CIR delay and a target delay position, e.g., the center of the CIR search window. An adjustment is made to reduce that error so that the target position and the mean CIR delay are aligned. A Doppler effect associated with the received signal is taken into account in determining the adjustment signal.

In particular, a Doppler frequency is determined for the received signal and used to determine a maximum rate at which the search window can be moved when it is adjusted. In other words, if a path fade occurs, the search window is restricted in how fast it can shift the search window in responding to the faded path. The maximum search window shifting rate is related to the maximum Doppler frequency of the received signal. One way of implementing this is to formulate a minimum dwell time (MDT) for the search window using a maximum Doppler frequency estimate of the received signal. The MDT is the minimum time the search window should stay in its current position before being adjusted to a new position. The MDT should not be too long because the PN generators may drift to the point where a search window adjustment is necessary. However, the MDT should not be too short that an adjustment is made before a faded path will reappear. In other words, the restricted shift rate or minimum dwell time ensures that the search window tracking unit on the one hand does not correct (or overcorrect) too soon and on the other hand does not correct too late.

In a preferred example embodiment, the search window adjustment signal is determined by averaging the error between the mean delay and the target delay position using the minimum dwell time. For example, if the minimum dwell time is five signal transmission frames, and the error is determined once per frame, the five errors are summed and divided by five to arrive at an average error. If desired, upper and/or lower limits can be used for the averaging period, e.g., for high Doppler frequencies, low Doppler frequencies, or both. In addition, the adjustment amount can be limited if desired.

One example application of the present invention is to a radio base station that includes plural cells, each one of the cells having one or more directive antennas receives a signal from a mobile station that contains multiple paths. Each path has a corresponding delay. A multipath search processor at the base station includes plural channel estimators, one corresponding to each of the plural cells. Each channel estimator generates a delay profile within a search window containing the actual channel impulse response as well as noise and interference. A path selector in the multipath search processor selects paths with strongest signals from the delay profiles generated by each channel estimator and outputs a selected channel impulse response made up of the corresponding delay and power for each selected path. A window tracking unit maintains alignment of channel impulse response and a target position of the search window. A demodulator demodulates the selected paths and combines the demodulated paths into a combined received signal. The window tracking unit adjusts the search windows in the channel estimators, taking the maximum Doppler frequency of the received signal into account to maintain accurate alignment, as well as adapt the delays for the selected paths according to the search window adjustment.

BRIEF DESCRIPTION OF THE DRAWINGS

The foregoing and other objects, features, and advantages of the invention will be apparent from the following description of preferred embodiments as well as illustrated in the accompanying drawings in which reference characters refer to the same parts throughout the various views. The drawings are not necessarily to scale, emphasis instead being placed upon illustrating the principles of the invention.

FIGS. 9–11 are graphs illustrating Doppler frequency relative to another parameter of interest.

DETAILED DESCRIPTION

In the following description, for purposes of explanation and not limitation, specific details are set forth, such as particular embodiments, circuits, signal formats, techniques, etc. in order to provide a thorough understanding of the present invention. However, it will be apparent to one skilled in the art that the present invention may be practiced in other embodiments that depart from these specific details. For example, while the present invention is described in the context of a base station receiver, the present invention may be applied to any receiver, e.g., in a mobile station. In other instances, detailed descriptions of well-known methods, devices, and circuits are omitted so as not to obscure the description of the present invention with unnecessary detail. Moreover, individual function blocks are shown in some of the figures. Those skilled in the art will appreciate that the functions may be implemented using individual hardware circuitry, using software functioning in conjunction with a suitably programmed digital microprocessor or general purpose computer, using an Application Specific Integrated Circuit (ASIC), and/or using one or more Digital Signal Processors (DSPs).

Figure 1:
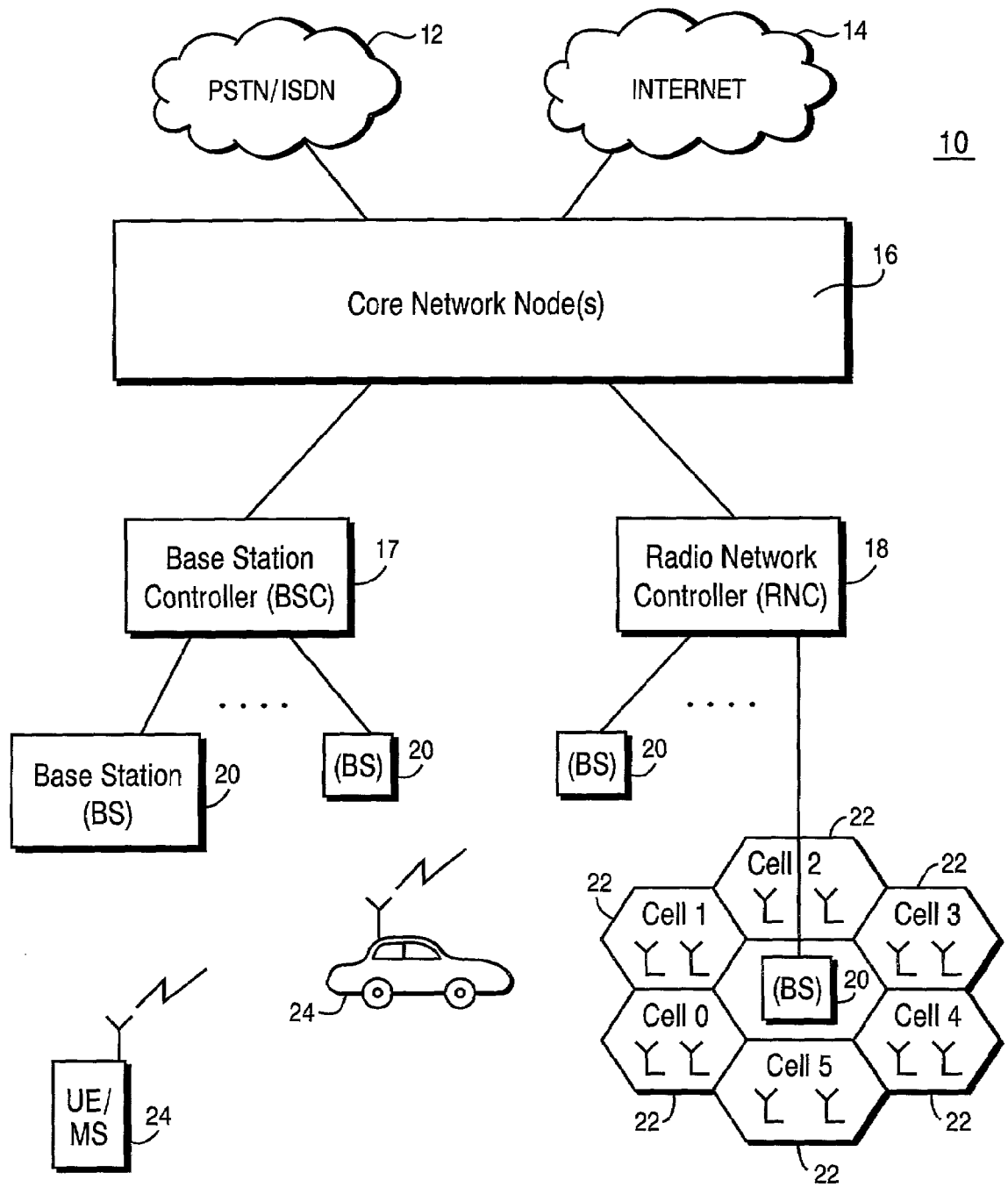
FIG. 1 is a function block diagram of a cellular radio communications system in which the present invention may be employed.

The present invention is described in the context of a CDMA cellular radio telecommunications system 10 as shown in FIG. 1. A representative, circuit-switched, external core network shown as cloud 12, may be for example the Public Switched Telephone Network (PSTN) and/or the Integrated Services Digital Network (ISDN). A representative, packet-switched, external core network shown as cloud 14, may be for example the Internet. Both core networks are coupled to one or more core network nodes 16. Examples of core network service nodes in a mobile switching center (MSC) node and a gateway MSC (GMSC) provide switching services and a serving general packet radio services (GPRS) support node (SGSN) and a gateway GPRS support node (GGSN) to provide packet services. The core network service node(s) is(are) connected to one or more base station controllers 17 and/or one or more radio network controllers (RNCs) 18. Each such controller establishes and releases a particular connection between one or more base stations (BSs) 20 and user equipment (UE)/mobile station (MS) 24 including the selection and allocation of spreading codes and diversity handovers. A base station 20 handles the CDMA radio interface to mobile station 24 and includes radio equipment such as transceivers, digital signal processors, and antennas required to serve each cell and cell sector in the network. As shown for one base station 20, each base station may include multiple cells 22, and each cell preferably includes two diversity antennas.

Figure 2:
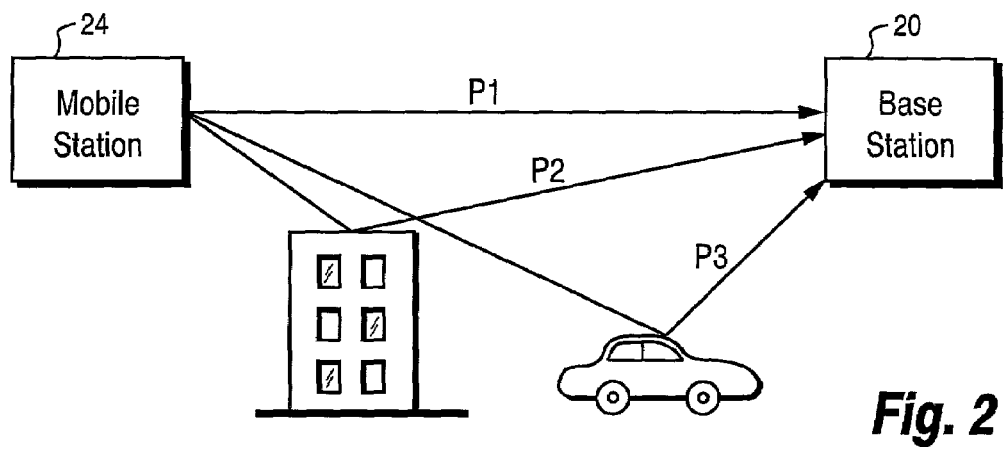
FIG. 2 is a drawing illustrating multipath propagation between a mobile station and a base station.

FIG. 2 illustrates a simplified, dynamic multipath propagation model. While multipath propagation must be addressed by both mobile stations and base stations, for description purposes only, the multipath example illustrates a signal being transmitted from a mobile station 24 to a base station 20. The transmitted signal is received at the base station 20 by the diversity antennas in plural sectors 22 with each received signal having multiple paths P1, P2, and P3. Path 1 is the direct, first received, and often the strongest path. Path 2 is reflected off a stationary object such as a building. Path 3 is reflected off a moving object such as an automobile. The mobile station 24 may be also be moving. The basic problem then for the receiver in the base station 20 is to identify each of these paths P1–P3 to determine their magnitude and relative delay so the three paths may be diversity-combined taking into account their respective delays $\tau_1$, $\tau_2$, and $\tau_3$.

Figure 3:
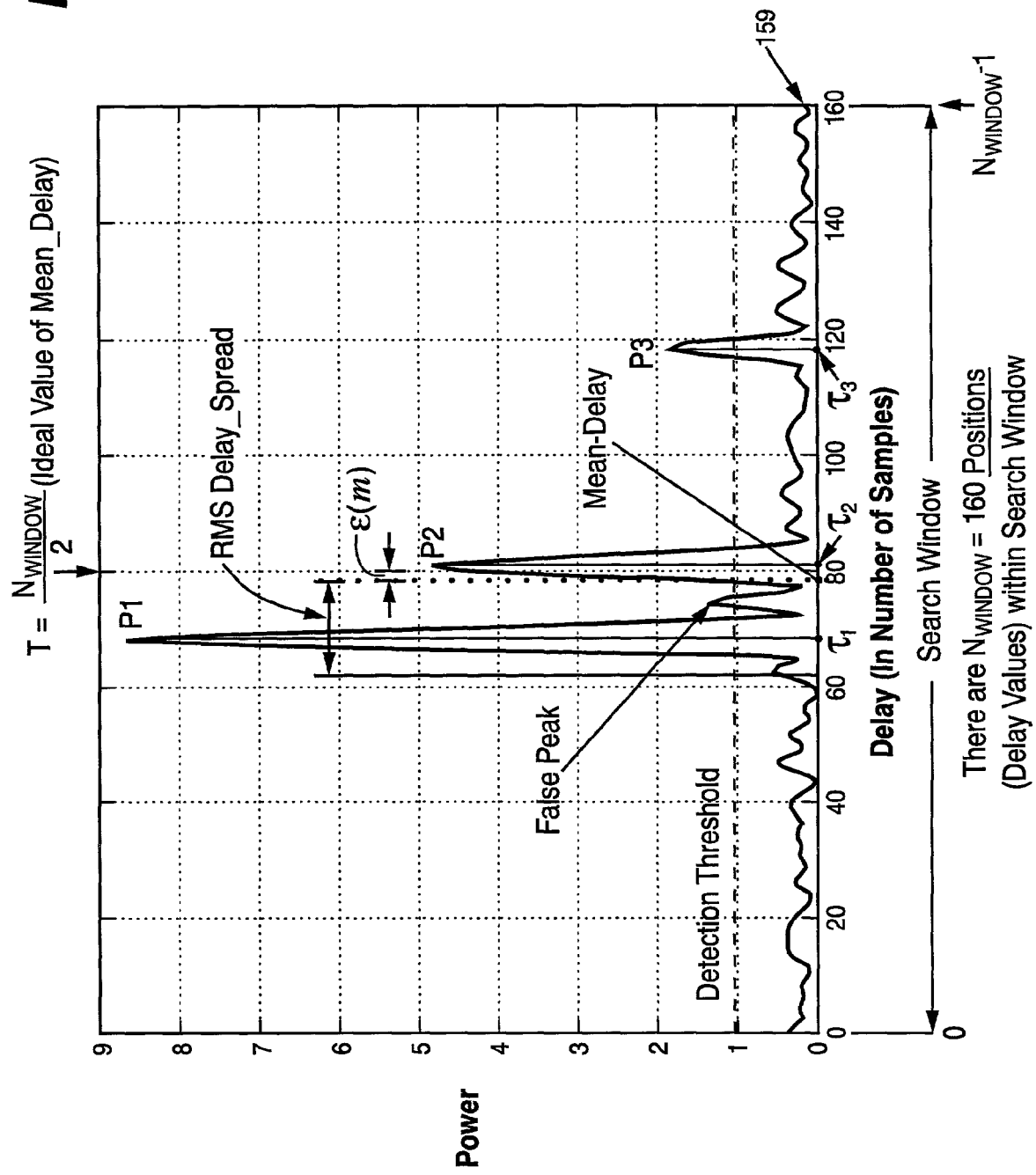
FIG. 3 is a graph showing an example multipath channel impulse response delay profile useful in illustrating principles of the present invention.

FIG. 3 illustrates a graph employed to help explain principles relating to a multipath searcher used in the receiver. The vertical axis of the graph is received signal power. The horizontal axis is delay time intervals related to the rate at which the received signal is sampled. The waveform is the estimated channel impulse response and includes four peaks having a magnitude that exceed a detection threshold. Only the three peaks corresponding to paths P1, P2, and P3 are valid multipaths. The fourth peak is a false peak, but because it exceeds the threshold, it is also identified as the path. Path 1 corresponds to delay $\tau 1$, path 2 corresponds to delay $\tau 2$, and path 3 corresponds to delay $\tau 3$.

The width of the horizontal axis corresponds to a search window. The length of the search window is sufficient to fully encompass the channel impulse response (all of the significant multipaths of the received signal) plus an additional offset so that the window is somewhat wider than the portion of the channel impulse response containing valid multipaths. More formally, the search window is defined by the number of delay values used as starting positions for correlating the received signal with the PN code in order to cover the maximum expected delay of the last-arrived, detected multipath component with respect to the first-arrived, detected multipath component. In this example, the number of complex samples corresponding to the maximum expected multipath delay is 160, and therefore, $N_{window}$ equals 160 delay positions.

In this example of FIG. 3, the center of the search window, ($N_{window}/2=80$ delay positions), is set as the target position T to which the center of the channel impulse response is to be aligned. This assures that the channel impulse response including the strongest valid multipaths are contained within the search window for processing, e.g., demodulation. However, the target window position T may be set to any other position within the window. Off-center positions may be more advantageous for accommodating exponentially decaying power delay profiles.

Simply choosing the strongest or the first-arrived path as an alignment point for the search window does not yield particularly accurate results, because either one of these alignment points fluctuates according to fading or noise, and consequently, the search window is not aligned with the channel impulse response. Instead, in the present invention, the search window is aligned using a mean or average delay value of the channel impulse response, and the mean delay is determined by averaging the delays of each of the multipaths of the channel impulse response. The difference or error $\epsilon$ between a target position e.g., the center of the search window $N_{window}/2$ at delay position 80 in FIG. 3, and the mean delay location at a delay position slightly less than 80 is detected.

The present invention employs Doppler frequency in generating an adjustment signal to reduce the error because the validity of the channel estimates (including the power delay profile and the search window position) depends significantly on the speed of the mobile station. In general, the Doppler effect is the change in apparent frequency of transmitting source of electromagnetic radiation, (e.g., an RF carrier), when there is relative motion between the transmitter and the receiver. In this non-limiting example, the relative motion is caused by the movement of the mobile station relative to the fixed base station. The Doppler frequency of the received signal depends on velocity of the mobile station, the speed of light, and the chip rate of the signal transmission from the transmitter.

The Doppler frequency may be determined in the RAKE receiver using complex channel coefficients from each RAKE/demodulator finger. One example algorithm that may be employed is described in commonly-assigned U.S. patent application Ser. No. 09/812,956, entitled "Method and Apparatus for Estimating Doppler Speed," filed on Mar. 27, 2001, the contents of which are incorporated herein by reference. In brief, the autocorrelation function of a Rayleigh fading channel is calculated using those coefficients. The position of the first zero crossing of the autocorrelation function depends on the maximum Doppler frequency. The maximum Doppler spread is calculated using the first zero crossing. From the power density function of a Rayleigh fading channel, also known as "Jakes spectrum," paths arriving with the highest Doppler frequency contribute the highest energy to the RAKE receiver.

As described in the background, it is difficult to keep the channel impulse response within the search window under certain propagation conditions including, for example, slow fading conditions, e.g., 0.5 km/h–3 km/h, as well as fast fading conditions, e.g., 250 km/h–500 km/h. Fading is a problem because when a path in the search window "disappears" because of a fade, just relying on the error $\epsilon$ to adjust the position of the search window ignores the possibility, even likelihood, that the faded path often reappears. If the search window is adjusted too rapidly, assuming that the faded path no longer exists, the window may be badly misaligned when the faded path reappears. To overcome this problem, a minimum search window dwell time is determined from a maximum Doppler frequency and is used along with the error to adjust the location of the search window (or by making some other adjustment). This is explained in further detail below.

Figure 4:
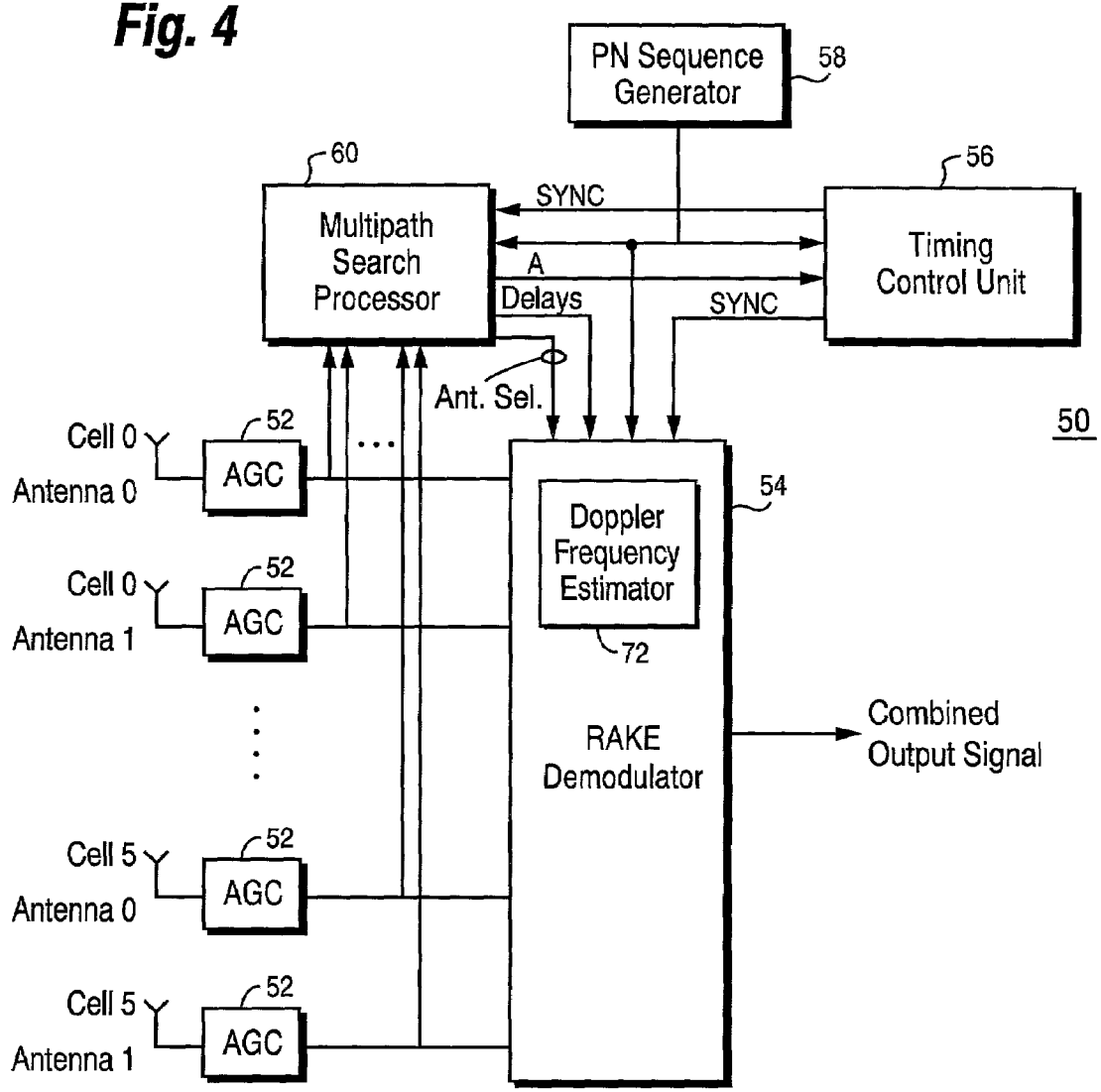
FIG. 4 illustrates an example embodiment of a CDMA receiver in which the present invention may be employed.

With the multipath illustration of FIG. 2 and the graph in FIG. 3 in mind, (including the parameters defined in FIG. 3), reference is now made to a base station receiver 50 and FIG. 4. Again, while the preferred example embodiments are described with the present invention employed in the base station 20, those skilled in the art will appreciate that the present invention may be employed in any receiver, including a receiver in the mobile station.

Receiver 50 includes a RAKE demodulator 54 having a plurality of RAKE finger demodulators (not shown) which receive inputs from a PN sequence generator 58 (i.e., a PN de-spreading code sequence) and from a timing control unit 56. The timing control unit 56 generates synchronization (SYNC) signals provided to the RAKE demodulator 54 and to a multipath search processor 60 also connected to the RAKE demodulator 54. Signals from two diversity antennas 0 and 1 for each six base station sectors or cells (0–5) are input to respective automatic gain control (AGC) circuits 52. Each AGC circuit is connected to both diversity antenna signals to reduce the long term dynamic range of the received signal, thereby reducing the required number of bits for signal representation but at the same time preserving the information content of the signal. Analog-to-digital conversion can be performed before or after AGC and therefore is not explicitly shown in the figure. The multipath search processor 60 calculates delay profiles for each of the cells using those output samples as described in further detail below. The signal samples are also provided to the RAKE demodulator 54 for de-spreading and combining. The combined output signal is generated using a number of antenna signals from different sectors selected by the multipath search processor according to the strongest multipaths received by all of the base station cells.

While the present invention is directed specifically to the multipath search processor 60, a brief, general understanding of how the base station receiver processes received signals is helpful in understanding the present invention. Pilot symbols or other known signals transmitted from the mobile station are used by the o base station to estimate the channel impulse response. The base station needs to derive synchronization signals necessary to extract periodically inserted pilot symbols from the received signal samples. Such initial synchronization may be obtained after a random access procedure employed by mobile radios over a known access channel used to acquire a traffic channel from the base station. After successful completion of the random access procedure, the base station is synchronized to the first-arrived, detected multipath signal component originated from the mobile station. That initially received synchronization signal is used to extract pilot symbols subsequently transmitted on the traffic channel. Further adjustment of the synchronization signal is the task of window delay tracking unit in the searcher.

Figure 5:
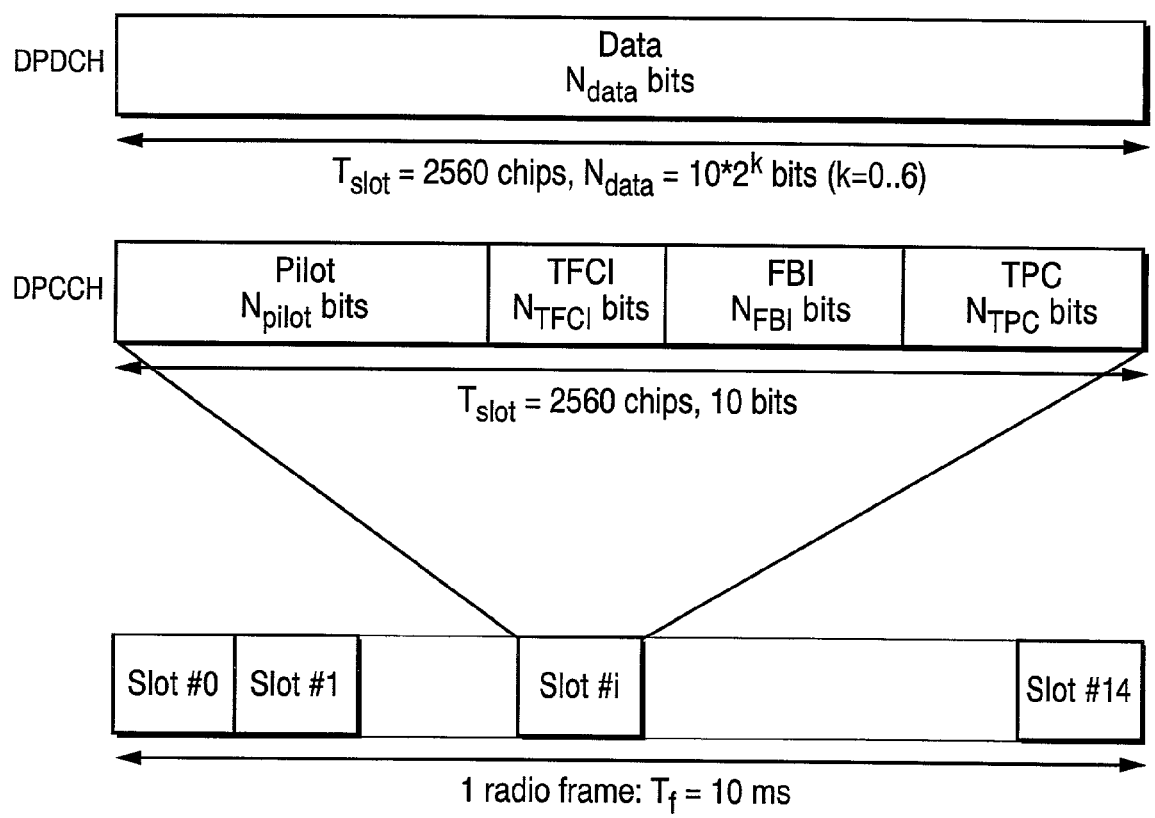
FIG. 5 illustrates a format of an example information signal as transmitted processed and demodulated by the receiver in FIG. 4.

In order to understand the role and use of pilot symbols, reference is now made to FIG. 5 which shows an example data format in which information is transmitted from the mobile station. Information symbols are formatted at the highest level as consecutive radio frames, where each radio frame may be 10 milliseconds. Similarly, each 10 millisecond radio frame may include 15 time slots, and each time slot includes pilot or known symbols used for synchronization and channel symbols containing unknown information symbols to be demodulated and communicated to the base station. There are two types of uplink dedicated physical channels, the uplink Dedicated Physical Data Channel (uplink DPDCH) and the uplink Dedicated Physical Control Channel (uplink DPCCH). The DPDCH and the DPCCH are I/Q code multiplexed within each radio frame.

Figure 6:
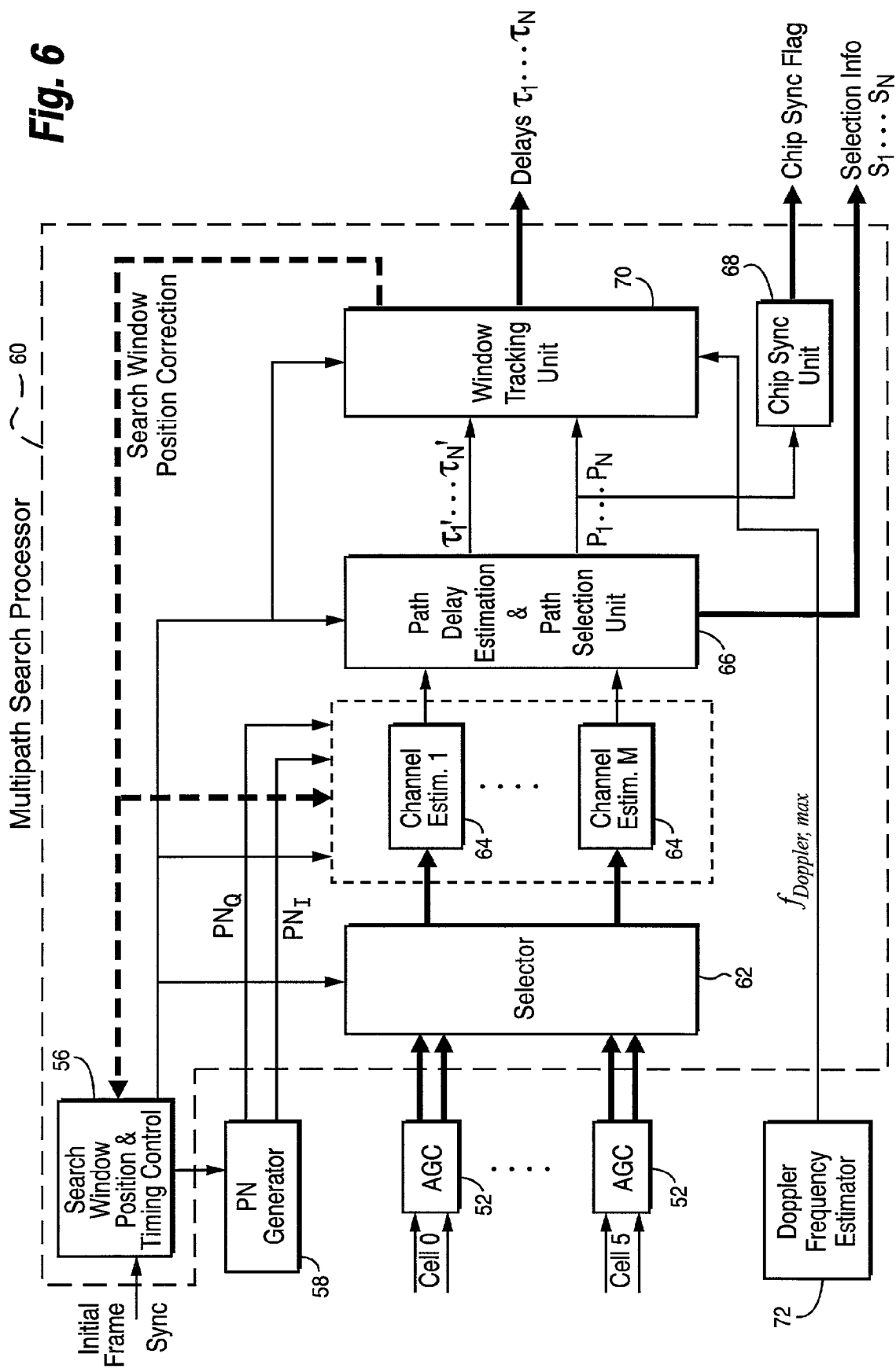
FIG. 6 is a function block diagram of the multipath search processor shown in FIG. 4 in which the present invention may be advantageously employed.

Assuming that initial synchronization is acquired, reference is now made to the multipath search processor 60 illustrated in additional detail in FIG. 6. The signal received by each automatic gain control unit corresponds to the signal transmitted by the mobile station. Each of the automatic gain control circuits 52 is connected to base station selector 62 which selects blocks of signal samples from both antenna signals from each base station sector. Again, while cells and antenna diversity are employed in this example embodiment, it is understood that the present invention is not restricted to antenna diversity or to base stations with plural cells.

Each base station cell has a corresponding one of M channel estimators 64, where M equals the number of base station cells. The selector 62 extracts blocks of signal samples to be searched for known symbols, e.g., pilot symbols, and provides those blocks to their corresponding channel estimator 64. The channel estimators 64 perform code-matched filtering with coherent and non-coherent integration of the code matched filter responses. In coherent integration, complex correlation values obtained in a number of successive time slots for the same delay of the block of received signal samples are added together. In non-coherent integration, the powers of coherently-integrated correlation values are summed. For each antenna, the corresponding channel estimator delivers an average power delay profile corresponding to the estimated channel impulse response to the path delay estimation and path selection unit 66. The path delay estimation and path selection unit 66 discriminates between signal and noise samples in the M delay profiles and then selects a number of strongest path signals to be demodulated in the RAKE demodulator 54.

The corresponding path delays and powers of the N paths selected by the path delay estimation and path selection unit 66 are provided to a window tracking unit 70. The number N of selected paths should be equal to the number of RAKE fingers, but N can also be smaller if there are not enough paths with powers above the detection threshold. These selected paths form a selected channel impulse response as defined above.

The main function of the window tracking unit 70 is to keep the multipath channel impulse response at or near the target position T of the search window, e.g., in the middle. The search window position is corrected using a search window position correction signal from the window tracking unit 70 provided to the search window position and timing control block 56. By adjusting the phase of the generated PN code, i.e., the state of the PN generators applied to the channel estimator 64, the search window is effectively adjusted. Another function of the window tracking unit 70 is to adapt the selected path delays $\tau'_1, \ldots, \tau'_N$ in accordance with the search window adjustments. The path delay estimation and path selection unit 66 provides the selected path delays, $\tau'_1, \ldots, \tau'_N$ and corresponding powers $P_1 \ldots P_N$ to the window tracking unit 70.

As explained above, a Doppler frequency estimator 72 estimates a maximum Doppler frequency $f_{Doppler,max}$ for the received signal. The WTU 70 uses the selected path delays $\tau'_1, \ldots, \tau'_N$, corresponding path powers $P_1 \ldots P_N$, and maximum Doppler frequency $f_{Doppler,max}$ to determine the path delays $\tau_1, \ldots, \tau_N$, a mean delay, and a search window error. Using a minimum dwell time determined from $f_{Doppler,max}$ and the error $\epsilon$ between a target position and the mean delay, a search window position correction signal is determined sent back to block 56. A chip synchronization unit 68 determines whether an initial synchronization process is completed, and if so, sets a chip sync flag. The chip synchronization unit 68 detects that chip synchronization has been achieved if there is at least one selected path, with arbitrary power $P_k$, that exceeds a detection threshold in the path selection unit 66.

Figure 7:
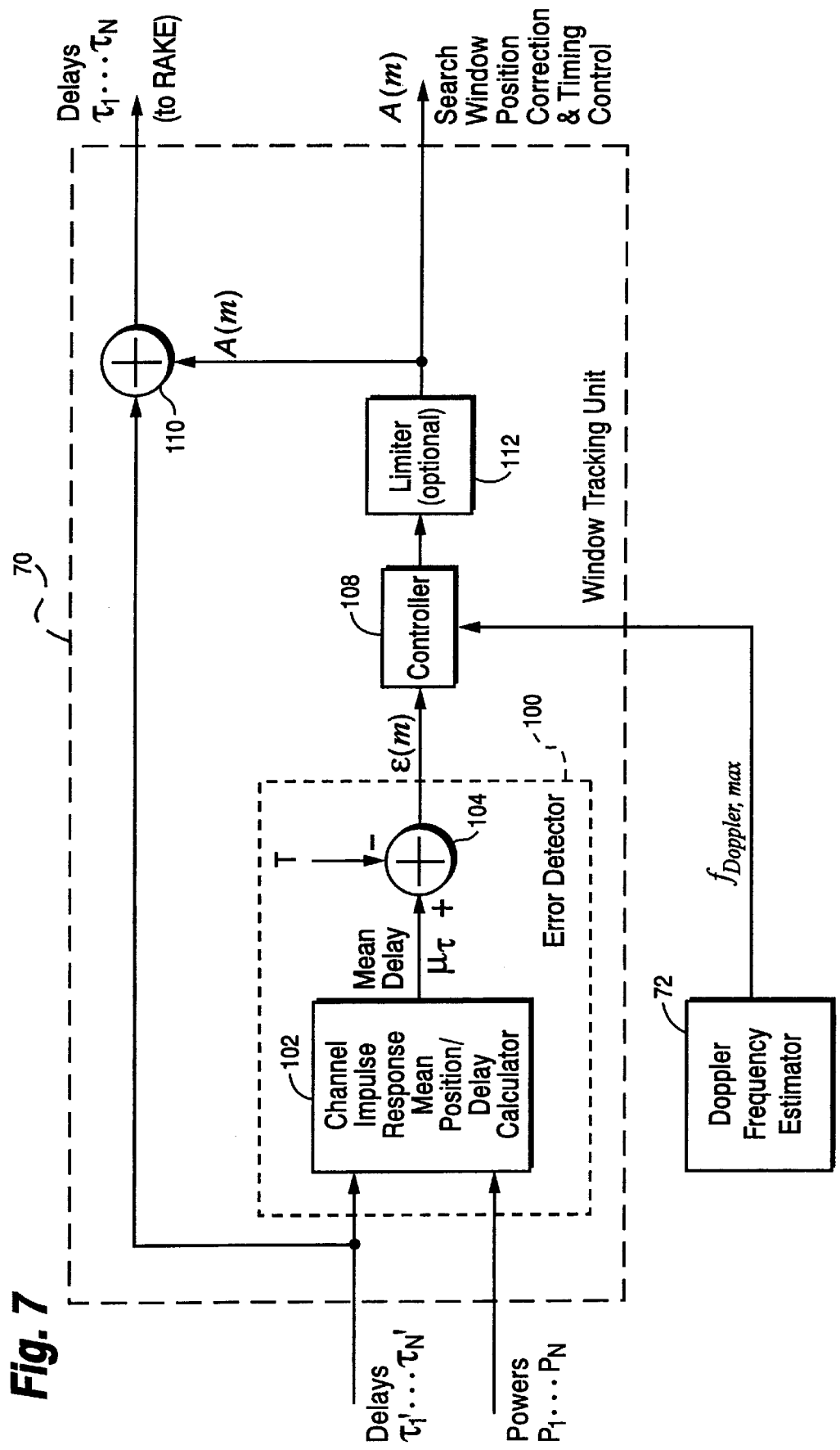
FIG. 7 is a function block diagram of a window tracking unit in accordance with an example embodiment of the present invention.

Referring now to FIG. 7, the window tracking unit 70 receives delays $\tau'_1, \ldots, \tau'_N$ and powers $P_1, \ldots, P_N$ for the selected paths from the path delay estimation and path selection unit 66 and the maximum Dopler frequency $f_{Doppler,max}$ from the Doppler frequency estimator 72. The window tracking unit 70 includes an error detector 100 which comprises a channel impulse response (CIR) mean position/delay calculator 102 connected to a summer 104 which also receives as an input at a subtraction terminal the target location T of the search window measured in delay intervals. The output of the summer 104 corresponds to an error signal $\epsilon(m)$ in a processing cycle m being analyzed by controller 108, e.g., a processing cycle may equal one frame. Examples of the search window, mean delay, delay spread, paths $P_1$–$P_3$, and delays $\tau_1$–$\tau_3$ are labeled in FIG. 3.

Controller 108 processes the error $\epsilon(m)$ taking into account the maximum Doppler frequency or minimum dwell time (MDT) to generate the adjustment signal A(m). The adjustment signal may optionally be limited and/or quantized before being provided to the search window position correction and timing control 56. In a preferred example embodiment, the adjustment signal, as is explained in more detail below, is determined by averaging the mean delay error over the MDT. By making the mean delay approximately constant for that MDT period, errors caused by disappearing/reappearing paths and other path detection errors are substantially reduced.

The search window position and timing control unit 56 controls the phase of the PN sequence generator 58 so that it is delayed or advanced according to the value of A(m). The adjustment signal A(m) is also used to adjust the selected path delays $\tau'_1, \ldots, \tau'_N$ which are provided to the RAKE demodulator so that appropriate delays can be applied to the RAKE finger outputs for coherent addition to generate the combined output signal.

Figure 8:
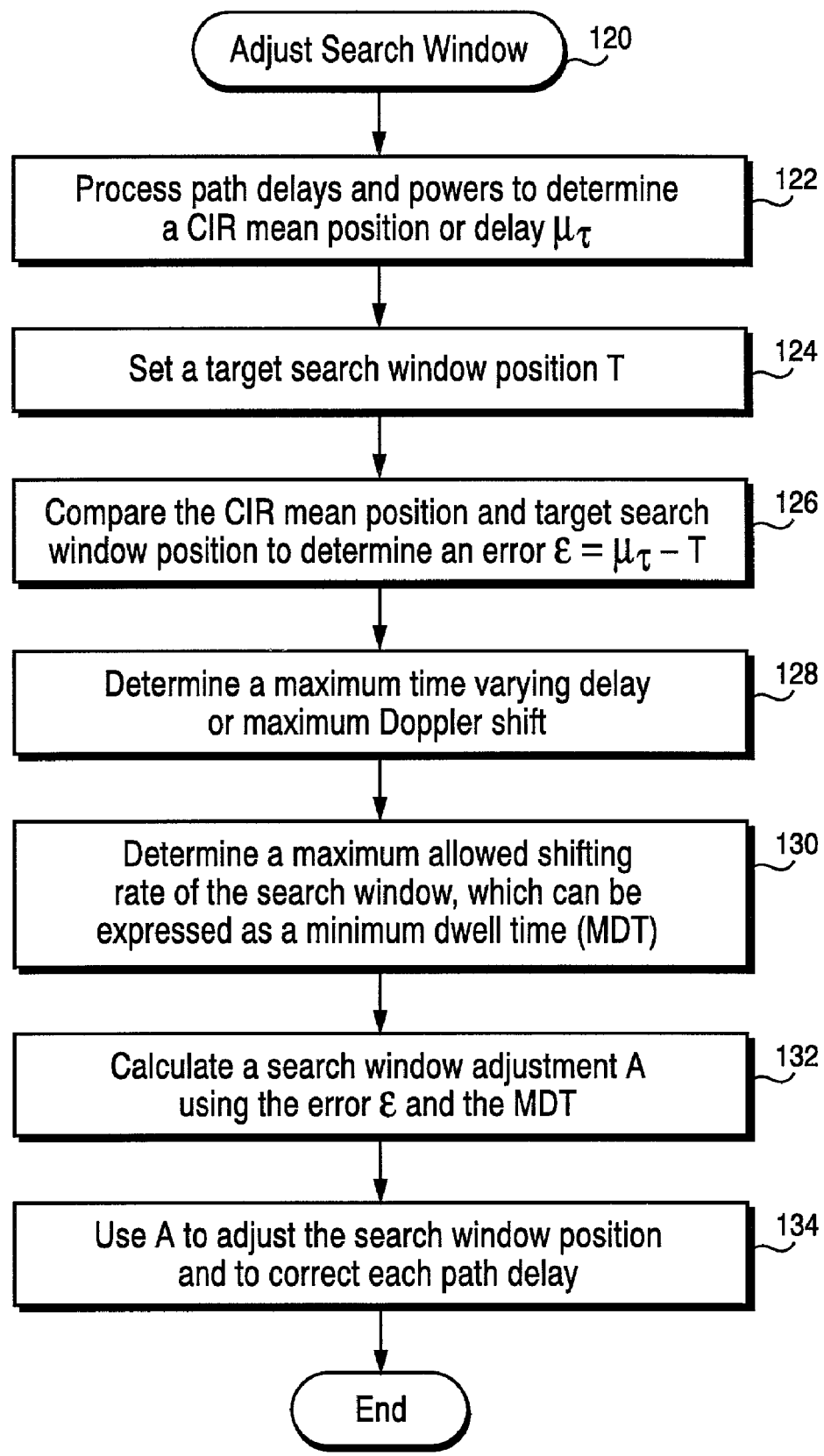
FIG. 8 is a flowchart illustrating search window delay tracking procedures in accordance with an example embodiment of the present invention.

The general operation for adjusting the search window is now described in the Adjust Search Window routine (block 120) shown in flowchart format in FIG. 8. Received signal path delays and powers corresponding to those strongest paths selected for RAKE demodulation are processed to determine a channel impulse response (CIR) mean position or delay $\mu_\tau$ (block 122). In other words, the path delays and powers of the selected paths make up the channel impulse response corresponding to the received signal. The CIR mean position is compared to a target position T in a search window (block 124) to determine an error $\epsilon(m)$ (block 126). A maximum time varying delay or maximum Doppler shift for the received signal is determined (block 128). A maximum allowed shifting rate of the search window, which can be expressed as a minimum dwell time (MDT), is determined from the maximum Doppler delay shift (block 130). A search window adjustment A(m) is then calculated using the error $\epsilon(m)$ and the minimum dwell time (block 132). That adjustment A(m) is used to adjust the search window position relative to the CIR mean position as well as to correct each path delay used by the RAKE demodulator (block 134).

Specific example parameters and equations that may be used in the window tracking unit 70 to perform various functions are now described. The mean delay, which may be defined as the first moment of the power delay profile (PDP), is calculated using the following equation:

$$\text{mean\_delay} \mu_\tau = \frac{\sum_{k=1}^{N} \tau'_k \cdot P_k}{\sum_{k=1}^{N} P_k}, \quad \text{if } \sum_{k=1}^{N} P_k > 0, \quad (1)$$

where $\tau'_k \in (0, 1, \ldots, N_{window-1})$ are path delays, N is the number of selected paths, and $P_k$ are the corresponding signal powers. Each path delay is expressed as an integer number of positions (sampling time intervals) from the search window start position. The total number of searched positions within the search window is equal to $N_{window}$. The value of $\mu_\tau(m)$, where m is an index, may be viewed as a center of gravity with regard to path power of the selected paths.

The error signal $\epsilon(m)$ is obtained as the difference between the mean_delay $\mu_\tau(m)$ and the target position T in the search window, i.e., $$\epsilon(m) = \mu_\tau(m) - T$$

The controller 108 processes the error signal $\epsilon(m)$ in order to reduce the influence of noise, i.e., to prevent or reduce the movement of the search window due to an erroneous adjustment signal produced as a result of noise or interference, and to reduce the impact of erroneously detected paths. When one of the selected paths experiences a fade, the center of gravity of the channel impulse response moves, which otherwise would trigger an immediate and significant correction.

The window position is expected to be shifted due to (1) long-term appearance/disappearance of paths caused by changed shadowing or path loss (reflected in changing $\mu_\tau(m)$); and (2) time-varying delay of an already existing path (reflected in $f_{Doppler,max} \neq 0$). The maximum of the time-varying delay, i.e., the maximum Doppler delay shift $s_{Doppler,max}$, is given by $$s_{Doppler,max} = \max\{s_{Doppler}\} = \frac{v}{c} \cdot r_{Chip} \left[\frac{\text{chip}}{s}\right], \quad (3)$$

where v denotes speed of the mobile station, c the speed of light (300,000 km/s), and $\gamma_{Chip}$ the chip rate. It can be computed also by $$s_{Doppler,max} = \max\{s_{Doppler}\} = \frac{f_{Doppler,max}}{100} \cdot \frac{r_{Chip}}{f_c} \left[\frac{chip}{frame}\right], \quad (4)$$

where $f_c$ denotes the carrier frequency.

In a Rayleigh fading multipath environment, it may be assumed that rays are received from any direction, i.e., with a uniform distributed angle $\alpha$. This can be expressed as $$s_{Doppler} = \cos(\alpha)\frac{v}{c} \cdot r_{Chip}\left[\frac{chip}{s}\right].$$

The max{ } operation in equations (3)–(4) effectively removes the $\cos(\alpha)$ term by selecting the peak or maximum of the signal.

FIG. 9 plots the Doppler frequency $f_{Doppler,max}$ as a function of mobile speed v. FIG. 10 plots the maximum Doppler delay shift $s_{Doppler,max}$ as a function of Doppler frequency $f_{Doppler,max}$.

From the maximum doppler delay shift $s_{Doppler,max}$ the maximum shifting rate of the searcher window allowable is determined. This maximum shifting rate can be expressed as the minimum dwell time (MDT) the searcher window should dwell at a certain position.

$$MDT = \frac{1}{|s_{Doppler,max}|}\left[\frac{frame}{chip}\right] \quad (6)$$

The controller 108 calculates the MDT in correspondence with equations (3)–(6). Afterwards, the controller calculates the adjustment signal A(m) from the error signal $\epsilon$(m) as function of MDT, e.g., the error is averaged over the MDT. The calculation of the adjustment signal A(m) can be implemented in several ways, e.g., (1) the adjustment signal A is an MDT-times downsampled version of the error signal $\epsilon$, effectively taking a snapshot of the error $\epsilon$ every MDT frames. The error over MDT frames is not averaged because the PN generators are assumed not to drift more than 1 chip per MDT and there is no attempt made to average out the effect of fading, or (2) the adjustment signal A is an averaged version of the error signal $\epsilon$ where the average length depends on the MDT.

The example averaging option (2) may be implemented as set forth below in pseudo-code in Table 1, where $M_1$ is a minimum number of frames to be averaged and may equal the MDT for the maximum expected $f_{Doppler,max}$ or may be set to a lower, perhaps more suitable value.

TABLE 1

Adjustment signal calculation pseudo code

%initialize variables
MMDT = 0;
error = 0;
accLength = 0;
or n = 1,2,3,4,...
    % accumulate error e and minimum dwell time MDT
    % assuming that one error value and one MDT value TABLE 1-continued Adjustment signal calculation pseudo code % is available per frame n
error + = e(n);
MMDT + = MDT(n); % mean MDT
% compute adjustment signal every M1st frame
if (n modulo M1) = = 0
    accLength + = M1; % actual averaging length
    MMDT / = M1; % actual averaging target length
    if (accLength > = MMDT)
        A(n) = error / accLength;
        accLength = 0;
        error = 0;
    else
        A(n) = 0;
    end
    MMDT = 0; % reset averaging target length
else
    A(n) = 0;
end
end For the total averaging length MMDT or for MDT, an upper limit M2 may be defined due to limited accuracy of the Doppler frequency estimation at very low mobile speeds/low Doppler frequencies. One example upper limit M2, assuming a minimum averaging length M1=51 frames, corresponding to $f_{Doppler,max}$=917 Hz (see FIG. 11), might be M2=20*M1=1020 frames. A lower limit may be defined by a worst-case speed of the mobile, e.g., 250–500 km/h. The mobile speed of 500 km/h corresponds to about 56 frames. FIG. 9 shows that 500 km/h corresponds to approximately 917 Hz. A Doppler frequency of 917 Hz corresponds to approximately an MDT of 56 frames using equations (4) and (6) assuming $r_{chip}$=3.86*10$^6$ chips/sec and $f_c$=1.98*10$^6$ Hz, resulting in $S_{Doppler,max}$=0.0178 chips/frame and an MDT=56.2 frames. To account for Doppler frequency estimation errors, the lower limit may be set, for example, to an averaging length of M1=51 frames. During a long averaging period, the mobile speed may change. Therefore, the MDT is preferably updated via corresponding $f_{Doppler,max}$ every M1 frames (or even more frequently). Averaging continues until the adjustment is made, at which time the averaging period is reset.

The adjustment signal may also optionally be limited. For example, for a search window at least as wide as the maximum expected mean delay, i.e., a wide window, the adjustment signal may be unlimited. For a shorter window, the adjustment signal may be quantized into the chip domain and limited to a 1 chip or a 2 chip adjustment per MDT. If the PN generator is limited to only one chip adjustment per frame, and a 2 chip adjustment is desired, then one chip may be adjusted at the current frame, and the second chip may be adjusted at the next frame.

The search window position control signal A(m) determines the relative phase of a PN sequence generator 58 with respect to the input signal via timing control unit 56, i.e., a positive or negative time shift of the generated PN sequence. A positive value of the control signal causes an additional delay of the generated PN sequence, and a negative value produces an advancement of the generated PN sequence. For practical implementation, it may be desirable to quantize the tracking control signal so that it corresponds to an integer number of PN chips. Because there is a fixed relation between the data symbol and PN sequence timing, the delay or advancement of the PN sequence phase influences frame, slot, and data synchronization in the same way.

Besides keeping the channel impulse response centered in the search window, the window tracking unit 70 adapts the selected path delays $\tau'_1, \ldots, \tau'_N$ according to the adjustments of the search window. Namely, there is a delay of one frame period before the searcher 60 determines the new path delays corresponding to the changed window position. During that time, the phase of the de-spreading PN sequence generated by the PN generator 58 will have already been adjusted, so for correct path combining in the RAKE demodulator 54, it is necessary to temporarily adjust the already found path delays, until the newly-determined, correct path delays arrive from the path selection unit.

There are a number of benefits provided by the present invention. First, the window tracking unit does not need to use any decision thresholds which simplifies the search window position correction and timing control procedure. Second, the window tracking unit is able to efficiently and effectively maintain the channel impulse response within the search window. Third, using the maximum Doppler frequency estimate, tracking jitter is decreased. Tracking jitter is the steady change of the mean CIR delay due to fading resulting in a steady adjustment of the search window position. Such jitter is decreased as a result of averaging the error signal. Fourth and related to the first advantage is the reduction of computational complexity relative to other possible approaches to search window position correction and timing control. Fifth, better performance is achieved in terms of noise and fading than such other approaches as well. In particular, reappearing faded paths are anticipated and accommodated.

The present invention may be implemented in other ways that do not use the specific examples provided above but that still take into account the Doppler frequency of the received signal in determining how to adjust the search window. From the example set forth above in the context of setting upper and/or lower limits on the averaging length, for an $f_{doppler,max}$ of 917 Hz (500 km/h), an averaging length of MDT=56 is needed. As an upper limit, M2=20*M1=1120 may be defined. If the receiver does not have an $f_{doppler,max}$ estimation, (for whatever reason), the mean between the upper and lower limits may be used, (M1+M2)/2=588, as a constant averaging length.

Such an averaged length would not be optimum for high and low mobile speeds. For high speeds, the mean averaging length would be too long. As a result, (1) fading is averaged for a longer period, (which is usually acceptable), and (2) the window is not moved often enough. For this latter result, if the search window is sufficiently large and if the adjustment signal A is not restricted, this may not be a problem. For low speeds, the mean averaging length would be too short. This also has two consequences. First, the fading is not averaged, causing erroneous window movement decisions and jitter. However, this drawback may still provide some benefit relative to a window tracking algorithm that does not use averaging. In other words, the jitter of a fixed-averaging solution is lower than that of a window tracking algorithm that does not use averaging. Second, the window is moved restricting the adjustment signal A. Thus, one or more "compromise" averaging lengths may be predetermined based on MDTs that are likely to occur in a system given a known Doppler frequency signal.

Accordingly, while the present invention has been described with respect to a particular embodiment, those skilled in the art will recognize that the present invention is not limited to the specific embodiments described and illustrated herein. Different formats, embodiments, and adaptations besides those shown and described as well as many modifications, variations, and equivalent arrangements may also be used to implement the invention. Therefore, while the present invention has been described in relation to its preferred embodiments, it is to be understood that this disclosure is only illustrative. Accordingly, it is intended that the invention be limited only by the scope of the claims appended hereto.

What is claimed is:

1. A method for use in a radio receiver comprising the steps of:
   estimating a channel impulse response for a received signal containing plural paths, each path having a corresponding path delay;
   calculating a mean delay for the estimated channel impulse response (CIR) using plural path delays;
   determining a delay error between the mean CIR delay and a desired delay position; and
   determining an adjustment signal to reduce the delay error taking into account a Doppler effect associated with the received signal;
   wherein a CIR search window defines a delay profile that contains the plural paths of the received signal;
   determining a Doppler frequency for the received signal;
   using the Doppler frequency to determine a shifting rate of the search window; and
   using the shifting rate in determining the adjustment signal.

2. The method in claim 1, further comprising:
   determining a maximum Doppler frequency for the received signal.

3. The method in claim 2, wherein the shifting rate is expressed as a minimum dwell time (MDT).

4. The method in claim 3, further comprising:
   calculating the adjustment signal using the error and the MDT.

5. The method in claim 4, wherein the adjustment signal is an MDT-times, downsampled version of the error signal.

6. The method in claim 4, wherein the adjustment signal is an average of the error signal over an averaging length that depends on the MDT.

7. The method in claim 1, further comprising:
   selecting optimal ones of the plural paths based on the estimated channel impulse response;
   demodulating each of the selected paths based on its corresponding delay; and
   combining the demodulated paths to generate a demodulated received signal.

8. The method in claim 1, the calculating step further comprising processing path delays and powers corresponding to the selected paths to determine the mean delay in accordance with the following:

$$\text{mean\_delay} = \frac{\sum_{k=1}^{N} \tau'_k \cdot P_k}{\sum_{k=1}^{N} P_k}, \text{ if } \sum_{k=1}^{N} P_k > 0,$$

where N is the number of selected paths, $\tau'_k \in (0, 1, \ldots, N_{window-1})$ are path delays, and $P_k$ are the corresponding path powers.

9. The method in claim 1, further comprising:
   adjusting delays for selected paths using the adjustment signal.

10. The method in claim 1, wherein the Doppler effect associated with the received signal is predetermined based on certain assumptions.

11. The method in claim 1, wherein the Doppler effect associated with the received signal is estimated based on a measurement of the received signal.

12. In a radio receiver receiving from each of plural cells a signal transmitted from a transmitter containing plural paths, each path having a corresponding path delay, a method comprising the steps of:
for each cell, estimating a channel impulse response (CIR) for the received signal using a channel estimator;
defining an associated search window for each channel estimator, where each search window defines a delay profile containing plural paths of the received signal;
selecting optimal ones of the plural paths from the delay profiles;
calculating a mean delay from the selected paths;
determining a delay error between the calculated mean delay and a desired delay;
determining a Doppler frequency for the received signal;
calculating an adjustment signal to reduce the delay error taking into account a relative movement between the receiver and the transmitter and the determined Doppler frequency;
using the Doppler frequency to determine a shifting rate of the search window; and
using the shifting rate in determining the adjustment signal.

13. The method in claim 12, wherein the Doppler frequency is predetermined based on certain assumptions.

14. The method in claim 12, wherein the Doppler frequency is estimated based on a measurement of the received signal.

15. The method in claim 12, further comprising:
determining a maximum Doppler frequency for the received signal.

16. The method in claim 15, wherein the shifting rate is expressed as a minimum dwell time (MDT).

17. The method in claim 16, further comprising:
calculating the adjustment signal using the error and the MDT.

18. The method in claim 17, wherein the adjustment signal is an MDT-times, down-sampled version of the error signal.

19. The method in claim 18, wherein the adjustment signal is an average of the error signal over an averaging length that depends on the MDT.

20. The method in claim 12, further comprising:
modulating each of the selected paths using its corresponding delay; and
combining the demodulated paths to generate a demodulated received signal.

21. The method in claim 12, further comprising:
adjusting delays for selected paths using the adjustment signal.

22. A search window tracking unit for use in a radio receiver receiving a transmitted signal having plural paths, comprising:
a processor configured to receive delay and magnitude values associated with selected paths of the received signal and determine a position of a channel impulse response (CIR) corresponding to the selected paths;
a controller configured to determine a position of a search window used to locate the channel impulse response that takes into account a Doppler effect on transmitted signals; and
an error detector configured to determine an error between the CIR position and a position of a search window used to locate the channel impulse response, and is further configured to generate an adjustment signal to reduce the error taking into account a relative movement between the receiver and a transmitter of the transmitted signal,
wherein the processor is further configured to:
estimate a Doppler frequency for the received signal;
use the Doppler frequency to determine a shifting rate of the search window; and
use the shifting rate in determining the adjustment signal.

23. The search window tracking unit in claim 22, wherein the Doppler effect is predetermined based on certain assumptions.

24. The search window tracking unit in claim 22, wherein the Doppler effect is estimated based on a measurement of the received signal.

25. The search window tracking unit in claim 22, wherein the processor is further configured to:
estimate a maximum Doppler frequency for the received signal.

26. The search window tracking unit in claim 25, wherein the maximum Doppler frequency is expressed as a minimum dwell time (MDT).

27. The search window tracking unit in claim 26, wherein the controller is further configured to calculate the adjustment signal using the error and the MDT.

28. The search window tracking unit in claim 26, wherein the controller is further configured to calculate the adjustment signal as an MDT-times, down-sampled version of the error signal.

29. The search window tracking unit in claim 26, the controller further configured to calculate the adjustment signal as an average of the error signal over an averaging length or period that depends on the MDT.

30. The search window tracking unit according to claim 29, wherein the averaging period is MDT frames.

31. The search window tracking unit according to claim 30, wherein the averaging period is limited for high Doppler frequencies, low Doppler frequencies, or both.

32. The search window tracking unit according to claim 22, wherein the controller is further configured to determine a mean position of the channel impulse response (CIR) and the error detector is configured to determine the error as a difference between the mean CIR position and the position of the search window.

33. The search window tracking unit according to claim 22, further comprising:
a limiter configured to limit the adjustment signal.

34. A radio base station comprising:
one or more cells, each of the one or more cells having one or more antennas receiving a signal from a mobile station containing multiple paths, each path having a corresponding delay;
a Doppler frequency estimator configured to estimate a Doppler frequency;
a multipath search processor including:
a channel estimator for each of the one or more cells, each channel estimator configured to estimate a channel impulse response (CIR) for the received signal and generate a delay profile within a CIR search window;
a path selector configured to select paths from the delay profiles generated by each channel estimator and generate a delay and a magnitude for each selected path; and a window tracking unit configured to maintain alignment between the CIR for each channel estimator and a target position of the channel estimator's corresponding search window using the estimated Doppler frequency; and a demodulator configured to demodulate the selected paths and combine the demodulated paths into a combined received signal, wherein the window tracking unit is configured to calculate a mean delay from the selected paths, determine an error between the mean delay and the target window position, and generate an adjustment signal used to shift each of the search windows to reduce the error using the error and a maximum Doppler frequency determined from the estimated Doppler frequency.

35. A radio base station in claim 34, wherein the estimated Doppler frequency is an estimate determined from the received signal.

36. The radio base station in claim 34, wherein the estimated Doppler frequency is predetermined based on certain assumptions.

37. The radio base station in claim 34, wherein the window tracking unit is configured to adjust the search windows to maintain the alignment and adapt the delays for the selected paths according to the adjustment to the search windows.

38. The radio base station in claim 34, wherein each cell includes two diversity antennas and the base station further comprises a cell selector for selecting one of the diversity antennas.

39. The radio base station in claim 34, wherein each search window is defined by N delay intervals corresponding to a number of sampling intervals.

40. The radio base station in claim 39, wherein the window tracking unit is further configured to limit the adjustment signal.

41. The radio base station in claim 34, wherein the maximum Doppler frequency is expressed as a minimum dwell time (MDT).

42. The radio base station in claim 41, wherein the window tracking unit is further configured to calculate the adjustment signal using the error and the MDT.

43. The radio base station in claim 42, wherein the window tracking unit is further configured to calculate the adjustment signal as an MDT-times, down-sampled version of the error signal.

44. The radio base station in claim 42, wherein the window tracking unit is further configured to calculate the adjustment signal as an average of the error signal over an averaging length that depends on the MDT.

45. The radio base station in claim 44, wherein the averaging length is limited for high Doppler frequencies, low Doppler frequencies, or both.

* * * * *